United States Patent [19]

Bird

[11] Patent Number: 5,418,537
[45] Date of Patent: May 23, 1995

[54] LOCATION OF MISSING VEHICLES

[75] Inventor: David G. Bird, Sunnyvale, Calif.

[73] Assignee: Trimble Navigation, Ltd., Sunnyvale, Calif.

[21] Appl. No.: 978,272

[22] Filed: Nov. 18, 1992

[51] Int. Cl.⁶ .......................... H04B 7/185; G01S 5/02
[52] U.S. Cl. ..................................... 342/357; 342/457
[58] Field of Search ................................. 342/357, 457

[56] References Cited

U.S. PATENT DOCUMENTS

| | | | |
|---|---|---|---|
| 4,908,629 | 3/1990 | Apsell et al. | 342/457 |
| 4,924,402 | 5/1990 | Ando et al. | 364/449 |
| 4,947,151 | 8/1990 | Rosenberger | 342/457 |
| 5,003,317 | 3/1991 | Gray et al. | 342/457 |
| 5,021,794 | 6/1991 | Lawrence | 342/457 |
| 5,043,736 | 8/1991 | Darnell et al. | 342/357 |
| 5,055,851 | 10/1991 | Sheffer | 342/457 |
| 5,177,685 | 1/1993 | Davis et al. | 364/443 |
| 5,208,756 | 5/1993 | Song | 364/449 |

Primary Examiner—Theodore M. Blum
Attorney, Agent, or Firm—John Schipper

[57] ABSTRACT

Method and apparatus for determining the present location of a missing vehicle, such as an automobile or marine vessel, using a Global Positioning System that receives GPS signals from two or more GPS satellites. A GPS antenna, GPS signal receiver/processor, a paging responder, a cellular telephone and associated antenna, and a controller/modem are installed in a vehicle and electrically connected together. When the vehicle is determined to be missing, because the vehicle has been misplaced, lost or stolen, the vehicle owner or operator contacts a vehicle location service center, which broadcasts a paging request that is received by the paging responder on the vehicle. The paging responder causes the controller/modem to interrogate the GPS receiver/processor to determine the present location of the vehicle. The receiver/processor determines the present vehicle location and notifies the controller/modem of such location. The controller/modem then causes the cellular telephone to notify the vehicle location service center of the present location of the missing vehicle so that the vehicle can be recovered. The GPS signal receiver/processor and GPS antenna can be replaced by a receiver/processor and associated antenna that works with a LORAN system, or with a group of gyroscopes or local magnetic field sensors mounted on the vehicle. Optionally, the signal receiver/processor is kept in a "sleeper" mode to conserve power, until the controller/modem receives a paging request for its present location. Optionally, the receiver/processor is periodically activated to determine, and thus update, its present location. Optionally, the presence of the GPS antenna and/or the cellular telephone antenna on the vehicle is concealed. In another embodiment, a sensor is positioned on the vehicle, and the cellular telephone is caused to transmit to the vehicle location center a message containing information on the present location of the vehicle when the sensor senses occurrence of a selected trigger event, such as unauthorized movement of, or breaking into, the vehicle.

27 Claims, 4 Drawing Sheets

LOCATION OF MISSING VEHICLES

FIELD OF THE INVENTION

This invention relates to use of a Global Positioning System or other location system for location of missing vehicles and to communication on demand of vehicle location information by a missing vehicle.

BACKGROUND OF THE INVENTION

Movable vehicles, such as automobiles, trucks, buses, boats, airplanes, motorcycles and motorized bicycles, are occasionally misplaced, lost or stolen, sometimes permanently. Between one and two percent of the automobiles three years old or less are stolen or taken, and the percentage of recovery of such vehicles is about 63 percent. Several inventors have developed methods that might be used to recover a missing vehicle, by continuous tracking of that vehicle.

A personnel locator system is disclosed in U.S. Pat. No. 3,439,320, issued to Ward. Each person carries a sensor/transmitter that emits a unique frequency whenever that person enters any one of a plurality of selected areas in a facility, with each such area having a receiver that receives this signal and transmits this information to a central processor. The processor keeps track of the movements of each person from one selected area to another area so that, at any given time, the processor can identify the selected area a given person now occupies. This approach is limited to a relatively small geographic area and to a relatively small number of covered persons.

Serrano et al disclose a microprocessor-controlled interface for a cellular phone system to be carried in a vehicle, in U.S. Pat. No. 4,718,080. A telephone handset communicates with the cellular transceiver along a bus and through the microprocessor that interprets bus logic signals, including voice and data signals. No integration is disclosed of the on-board cellular system with any instrument that reports vehicle operating information upon command received from a remote site.

U.S. Pat. No. 4,797,671, issued to Toal et al, discloses a motor vehicle locator system that indicates the location of a parked vehicle within a controlled area, such as a large parking lot. Each parked vehicle carries a receiver and audio/visual signal emitter. The receiver responds only to receipt of a signal having a unique frequency and causes the emitter to emit an audible or visually perceptible signal that indicates the present location of the parked vehicle. This approach requires that the vehicle be located within a controlled area of modest size, probably no larger than a city block.

Ando et al., in U.S. Pat. No. 4,837,700, disclose method and apparatus for processing and displaying the present location of a road vehicle, using a GPS receiver to provide data on vehicle location. This approach provides continuous information on vehicle location and vehicle orientation or movement vector based upon sensing the Earth's local geomagnetic field direction. An angular rate sensor determines, and optionally displays, the angular rate of change of vehicle orientation, and an odometer determines the distance the vehicle has moved over some predetermined time interval. The present vehicle location can be displayed graphically on an electronic map carried within the vehicle, with a sequence of maps being used to display the changing vehicle location. Map size can also be increased or decreased, and the displayed map can be automatically scrolled as vehicle position changes. A keyboard is available for entering instructions into a controller or processor. A reference location can be entered into the system, and vehicle location can be determined relative to this reference location. The location data can be stored if these data are acceptable and can be dumped into a bit bucket if these data are not acceptable.

In U.S. Pat. No. 4,924,402, Ando et al disclose a more detailed approach for determining and graphically displaying vehicle location using a GPS. This system uses a magnetic field sensor, an angular velocity sensor and a travel distance sensor together with GPS data and stores maps together with numerical data that describe useful features of the local terrain. Sensing of vehicle distance traveled and directional rams made is intended to be sufficiently accurate that the map displays the location of the vehicle relative to road intersections (i.e., approaching, passing through, turning, etc.). With reference to FIGS. 16–17, 22, 27–28 and 30, the invention appears to put a premium on receiving GPS data that are accurate to within one meter.

A paging system with paging request receivers that respond or are controlled differently, depending upon receiver location, is disclosed by Vrijkorte in U.S. Pat. No. 4,943,803. Using "angle modulation" whose operation is not explained, the paging request receiver is said to pick out the strongest transmission control signal from among simultaneously transmitted control signals and to respond to this signal, if the signal received includes the receiver's predetermined address code. The receiver goes into a "sleeper" mode if no signals specifically addressed to that receiver are received within a selected time interval. The receiver is activated for receiving a control message by receipt of a receiver activation signal that may vary with the geographic zone presently occupied by the receiver.

A portable target locator system is disclosed by Ruszkowski in U.S. Pat. No. 4,949,089. The locator uses a laser beam target locator and a GPS. The target locator is aimed by an observer on the ground at a nearby target, such as a moving tank. The position of the target is sensed using a return signal received by the target locator, and the position coordinates are transmitted by a modem to a weapon system, such as an aircraft. The weapon system uses this target position to direct a bomb or whatever to the target. If GPS position information is unavailable, the target position is determined manually. The target locator includes a rifle-like beam director that determines the target location relative to the beam director location and orientation. This information is transmitted to the weapon system, which also senses its own GPS-determined system and determines target position by an approach that may use differential positioning.

Nishikawa et al disclose a land vehicle navigation system in U.S. Pat. No. 4,949,268. A combination of three or more GPS satellites is selected, from among all available GPS satellites, that provides the best vehicle location data. Here, a figure of merit used is minimum position dilution of precision ("PDOP") associated with the data received from a given group of GPS satellites. This approach seeks to account for the possibility that one or more buildings or other structures of relatively great height may preclude satellite visibility. The height of the structures in that area may be stored as part of a map in a GPS processor on board the land vehicle whose location is to be determined. The on-board system seeks combinations with the highest number of satellites visible, then works from these combinations to minimize the PDOP or a similar figure of merit for GPS position data.

Bezin et al disclose a system for managing already-paid vehicle parking fares by means of information cards affixed to the vehicles, in U.S. Pat. No. 4,982,070. The card contains a confidential identification number for the vehicle and the prepaid vehicle parking and includes an adhesive label that allows the card to be affixed to a vehicle windshield or another visible area. A portable card checking machine, carded by a roving parking lot operator, allows readout of this information from the card.

A satellite signal tracking method for signal reacquisition in the presence of a "dead zone", such as a tunnel or very tall adjacent building that interrupts receipt of all GPS signals, is disclosed by Ando in U.S. Pat. No. 4,983,980. The tracking system determines the satellite that had the maximum elevation angle at the moment the GPS signals are interrupted and seeks and m-tracks that satellite as soon as the receiver clears the dead zone. The signal from the satellite with the next highest elevation angle is then reacquired and re-tracked, and so on. This allegedly minimizes the time for signal reacquisition. Little quantitative information is disclosed in this patent.

Scribner et al disclose a vehicle tracking system that records, but does not transmit, the location of a vehicle whenever one or more predetermined events occurs in U.S. Pat. No. 5,014,206. The vehicle carries sensors that respond to occurrence of a predetermined event and carries a GPS or LORAN navigational system that receives vehicle location information, such as longitude and latitude. This vehicle location information is stored in a memory on board the vehicle only when one or more of the predetermined events occurs. The vehicle location information is assumed to be read out periodically when the vehicle returns to a home base.

In U.S. Pat. No. 5,043,736, Darnell et al disclose use of a combined cellular telephone and GPS portable receiver system that provides latitude and longitude coordinate information for the receiver. The GPS receiver has a modem and transmitter connected thereto that transmit its position to an accessible cellular phone, which in turn notifies a stationary base unit of the location of the GPS receiver. The base unit graphically displays the present location of the GPS receiver. This patent does not disclose communication with the receiver by a paging system located elsewhere, to activate the transmitter and modem, nor activation of a GPS receiver in a vehicle that is later determined to be missing.

On-board navigation apparatus, to be carded on a vehicle to compare present and immediate-past locations as determined from GPS data, is disclosed by Odagawa et al in U.S. Pat. No. 5,087,919. A map containing coordinates for all roads in a region of the Earth's surface is stored electronically in a navigation system on board the vehicle, as part of a "map" of the region. The navigation system apparently assumes that the vehicle stays on one of the roads. Using the continuously arriving GPS data, the system searches for the nearest road segment that is consistent with these data to determine present location of the vehicle. Only latitude and longitude data are needed here so that fewer than four satellites may be used to determine the present location. Elevation data are provided as part of the road description stored in the navigation system. This system would not work well for a vehicle, such as an off-road land vehicle or a marine vessel, that has no fixed system of roads or paths to follow. This approach would not be particularly useful in determining the location of a stolen vehicle, unless the thief could be relied upon to stay on the conventionally describable roads.

Timothy et al, in U.S. Pat. No. 5,101,356, disclose providing a surface or airborne vehicle with three spaced apart antennas, each connected to a GPS receiver. The receiver output signals are connected to a phase comparator system that compares GPS signal phase differences and determines the vehicle attitude or orientation (pitch, roll and yaw) relative to a fixed spatial frame. Location of the vehicle is not of interest here.

Lojack Corp. of Dedham, Mass. has demonstrated a vehicle location system using triangulation of radio signals transmitted from the vehicle by a large number of receivers that are strategically positioned around a community. The vehicle transmitter is remotely activated by a signal broadcast from elsewhere.

These patents disclose use of GPS or related technology for determination of location or orientation of a person or vehicle continuously or at discrete times, without regard to the associated consumption of power, cost of tracking the vehicle, or cost of communicating the vehicle location. What is needed is a system that allows determination of location of a vehicle only when a trigger event occurs, such as misplacement or theft or unauthorized movement of the vehicle, so that power usage is controllable and is minimized, and communication from and tracking of the vehicle are minimized. The system should allow communication at will between the GPS receiver and an inquirer located elsewhere.

SUMMARY OF THE INVENTION

These needs are met by the invention, which provides method and apparatus for determination of vehicle location, usually when a trigger event occurs, such as determination that the vehicle is missing or that the vehicle has been moved without disabling a silent alarm on the vehicle. When the trigger event occurs, the vehicle owner or operator contacts a vehicle location service center, which broadcasts a page requesting the present location of the vehicle. The paging responder responds by notifying another entity, either electronically or visually or aurally, that the responder has received a page request focused on that page responder. The target of the page signal, usually a person or another electronic communications device, then responds in a predetermined manner. A battery back-up is optionally provided to provide power for this apparatus.

The page request from the vehicle location service center is received by a paging responder installed in the vehicle. A controller/modem, a Global Positioning System receiver/processor and a cellular telephone are also installed in the vehicle. The paging responder causes the controller/modem to interrogate the GPS receiver/processor to determine the present location of the vehicle. The receiver/processor determines the present vehicle location, from signals received by the receiver/processor from one or more GPS satellites, and communicates the present vehicle location information to the controller/modem. The controller/modem causes the cellular telephone to contact the vehicle location service center and to transmit to the center the present vehicle location information, for subsequent recovery of the vehicle or a related purpose. The page request may be coded to solicit one or more of several predetermined responses by the vehicle, such as contacting different telephone numbers. The GPS receiver/processor can be replaced by a receiver/processor that works with a LORAN system, or with a group of gyroscopes or local magnetic field sensors mounted on the vehicle.

The method and apparatus of the invention provide a missing vehicle locator system that allows a missing vehicle to be located anywhere on the Earth's surface that can be reached by a vehicle location paging request and GPS signals. The portion of the apparatus contained in the vehicle is preferably hidden and not in plain view of any person within or adjacent to the vehicle. Communications between the page broadcaster, the vehicle location center and the missing vehicle do not call attention to themselves so that no one in or adjacent to the missing vehicle is aware that such communications are being transmitted.

Because vehicle location is only reported after occurrence of a trigger event, such as determination that the vehicle is missing, the vehicle location service center tracks only a relatively small number of vehicles at one time, namely missing vehicles.

DETAILED DESCRIPTION OF THE INVENTION

Figure 1:
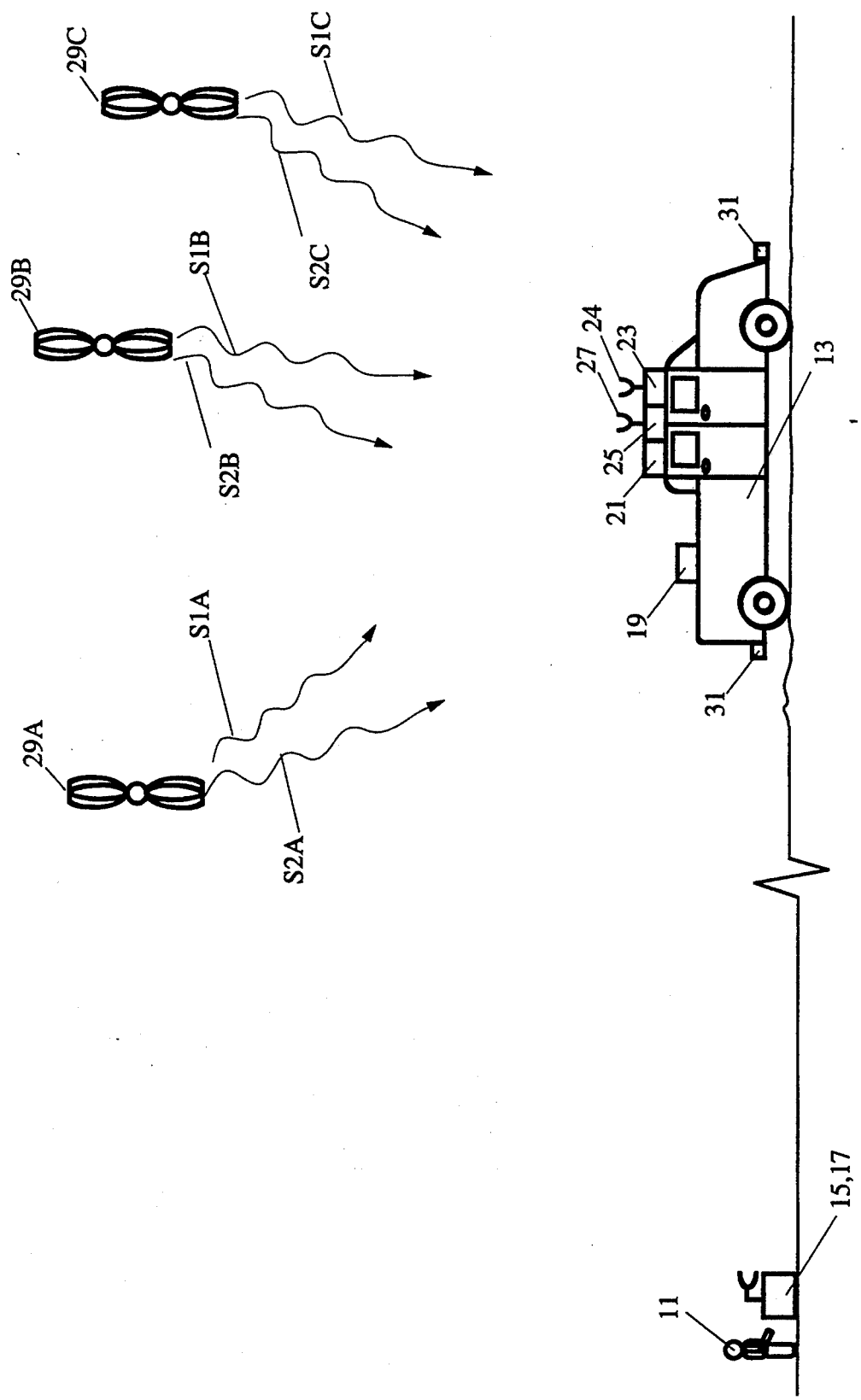
FIGS. 1 is a schematic view of apparatus for practice of the invention.

FIG. 1 illustrates apparatus used to locate a missing vehicle according to the invention. A vehicle owner or operator 11 realizes that his/her vehicle 13 is missing and initiates a GPS-assisted search for the vehicle by notifying a vehicle location center 15. The vehicle locator center 15 sends a vehicle pager request to a pager network 17, or initiates a vehicle pager request itself. A vehicle page is broadcast, specifying the missing vehicle 13 by means of a unique identifying code address or by other appropriate vehicle identification means. The vehicle 13 carries a paging responder 19, a controller/modem and interface 21, a cellular telephone 23 and associated antenna 24, and a GPS signal receiver/processor 25 that are electronically connected together. Preferably, each of these devices is concealed on or within the vehicle 13. For example, the receiver/processor 25 has one or more GPS antennas 27 (also hidden) to receive GPS position signals S1j and S2j (j=A, B, C) at the two frequencies used by each of the one or more GPS satellites 29A, 29B and 29C that transmit such signals. This antenna (or antennas) 27 can be mounted on or within one or more bumpers 31 or other projections of the vehicle 13, on a rear or side window of the vehicle, within a roof or top panel 33 of the vehicle 13, or elsewhere. Preferably, the antennas 24 and 27 are mounted on the vehicle so that the presence of these antennas is hard to detect.

A "page", as used herein, is a radiowave or other electronic communication, broadcast in a selected frequency band, that is intended only for and is sensed only by a particular receiver, referred to herein as a paging responder. A person or electronic device that carries or is attached to the paging responder then responds by placing a telephone call or by performing some other task to respond affirmatively to the page. Operation of a paging system is discussed by Ward in U.S. Pat. No. 3,439,320 and by Bunting in U.S. Pat. No. 3,599,200, both incorporated herein by reference.

The GPS signal receiver/processor 25 can operate only in response to receipt of an interrogation signal from the controller/modem 21, if desired, in order to reduce the electrical current draw from a power supply for the controller/modem. In this embodiment, the receiver/processor 25 is normally in a "sleeper" mode and is awakened only when needed. This approach conserves electrical power used to operate the receiver/processor 25 and also makes detection of the presence of the apparatus more difficult. Alternatively, the receiver/processor 25 may be awakened periodically (e.g., once every 15 minutes) to obtain a new fix on the GPS satellite(s) that provides the signals needed to calculate the present vehicle location. This apparatus serves as a missing vehicle locator system according to the following procedure.

Figure 2:
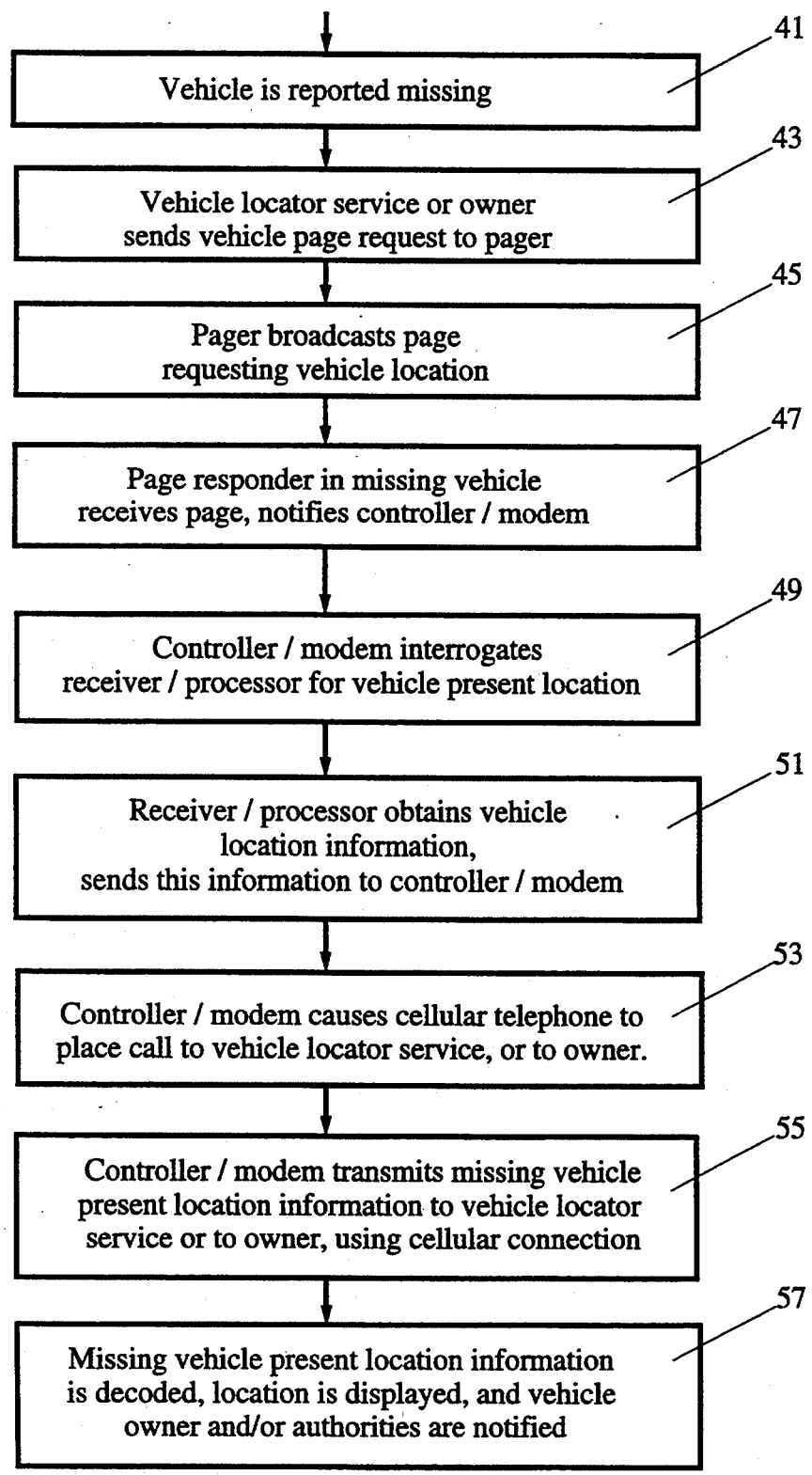
FIGS. 2 and 3 are flow charts for practice according to two embodiments of the invention.

FIG. 2 illustrates, in flow chart form, a procedure that can be followed to locate a missing vehicle. In step 41, a vehicle owner or operator notices that his/her vehicle 13 is missing and notifies a vehicle location service center (the "Center") 15. In step 43, the Center (or the vehicle owner) sends a page request to a pager network or broadcasts a paging request itself. A paging request is broadcast, requesting a response indicating the present location of the missing vehicle 13, in step 45. In step 47, the page responder 19 in the missing vehicle 13 receives the paging request and notifies the controller/modem 21 that a vehicle location request was received. In step 49, the controller/modem 21 interrogates the GPS signal receiver/processor 25, also located in the vehicle, as to the present, or last known, vehicle position. In step 51, the receiver/processor 25 obtains the present location information for the vehicle 13 from the GPS satellite signals and sends this position fix to the controller/modem 21. The receiver/processor 25 may have received this information continuously in the recent past, or the GPS receiver may have been "awakened" and caused to determine the present vehicle position by a missing vehicle notification received from the controller/modem 21.

In step 53, the controller/modem 21 causes the cellular telephone or similar communication means 23, also located in the missing vehicle 13, to place a call to the Center or to the owner. The handset for the cellular telephone 23 may be disabled by the controller/modem 21 to make the cellular phone appear to be non-operational, if the cellular phone is not hidden from view. When the Center answers the call from the cellular telephone 23, the controller/modem 21 transmits the vehicle present location information to the Center in a short burst of data, in step 55. The vehicle present location information can be updated continuously or intermittently, or the cellular telephone 23 may respond only once, as desired. In step 57, the Center decodes the vehicle position information (if this information is not already decoded), displays the vehicle present location on a map (optional), and notifies the vehicle owner and/or police of the vehicle's present location. The vehicle owner and/or police can then recover the missing vehicle. When the telephone call is terminated by the Center, the controller/modem discontinues sending location fixes.

Figure 3:
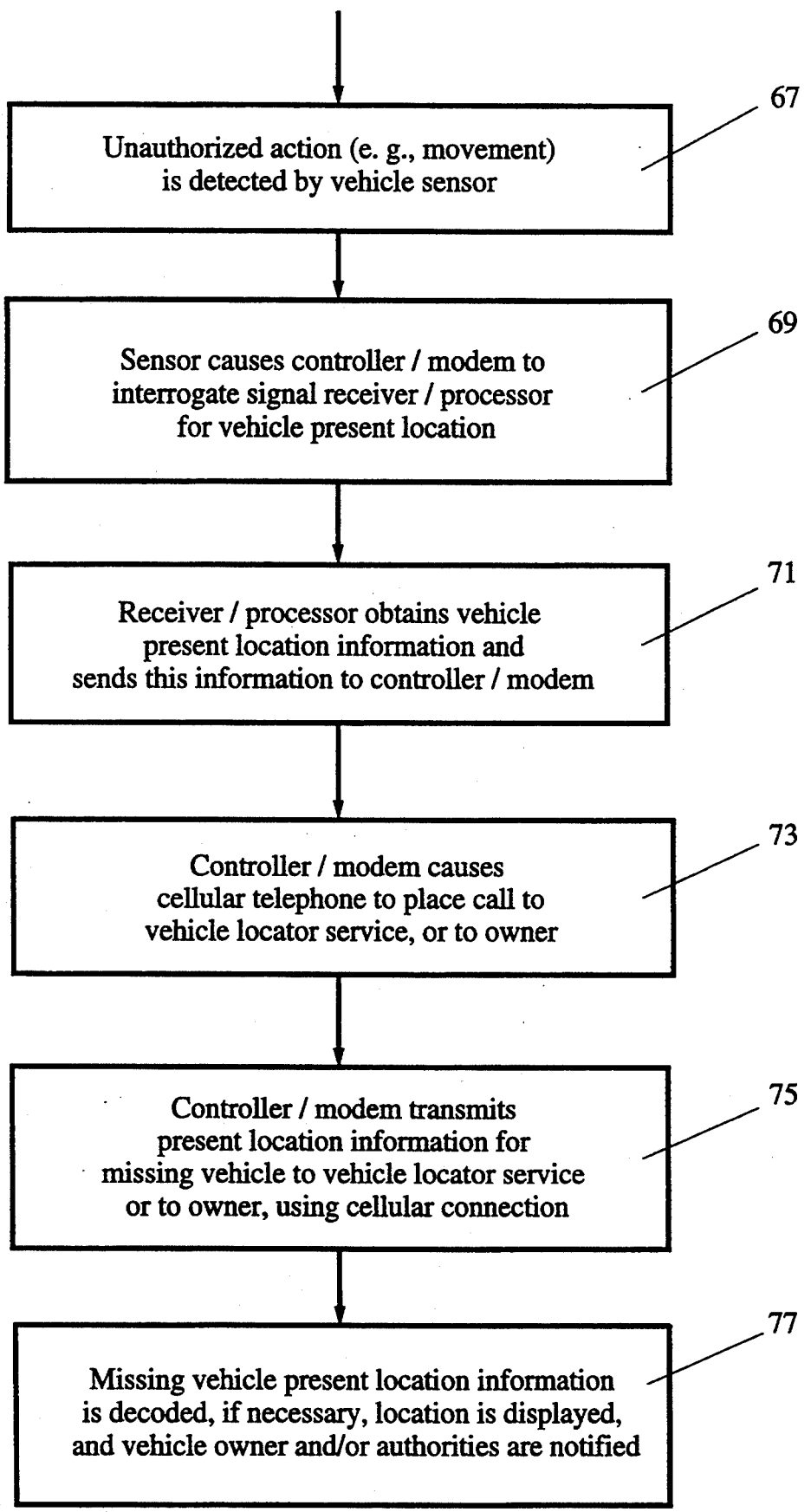

Alternatively, the trigger event that causes the vehicle location center 15 in FIG. 1 to be notified may be unauthorized movement of the vehicle or some other unauthorized action sensed by a sensor positioned on or adjacent to the vehicle 13. If this trigger event occurs, the vehicle 13 itself may notify the vehicle location center 15 of the unauthorized action and of the present location of the vehicle, without requiring receipt of a page. This procedure is illustrated in flow chart form in FIG. 3. In step 67, unauthorized action involving a vehicle, such as movement of the vehicle, is sensed by a trigger event sensor 79 (FIG. 5) that is attached to or adjacent to the vehicle 13. The event sensor 79 causes the controller modem 21 to interrogate the receiver/processor 25 for present location information on the (missing) vehicle, in step 69. The steps 71, 73, 75 and 77 in FIG. 3 are the same as the respective steps 51, 53, 55 and 57 in FIG. 2.

Figure 4:
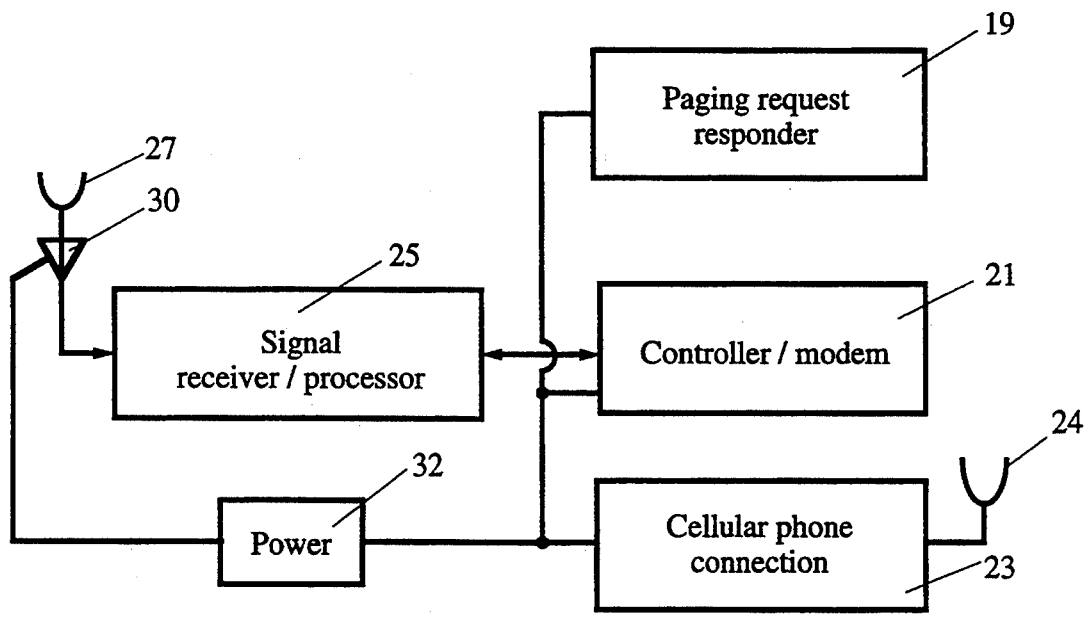
FIGS. 4 and 5 are schematic views of apparatus according to the two embodiments of the invention.

FIG. 4 illustrates electronic apparatus 61 to be carried on the vehicle according to the first embodiment of the invention. This apparatus includes: the antenna 27 to receive the GPS signals; an optional preamplifier 30 to enhance the GPS signals received by the antenna 27; the signal receiver/processor 25 to receive and process the GPS signals received from the antenna 27; the controller/modem 21 to receive a paging request, to interrogate the receiver/processor 25 when such paging request is received, and to transmit the vehicle location information, using a cellular connection; and the cellular telephone 23 to contact the vehicle location service center to assist the controller modem 21 in transmitting the present location of the vehicle 13. The vehicle battery (not shown) or a separate power supply 32 may supply power to operate the paging responder 19, the controller/modem 21, the cellular transmitter 23, the GPS signal receiver/processor 25, the antenna 27 and/or the preamplifier 30. Preferably, a back-up power supply, such as 32, provisionally provides power for operation of the other apparatus components when power from the primary power source is not available.

Figure 5:
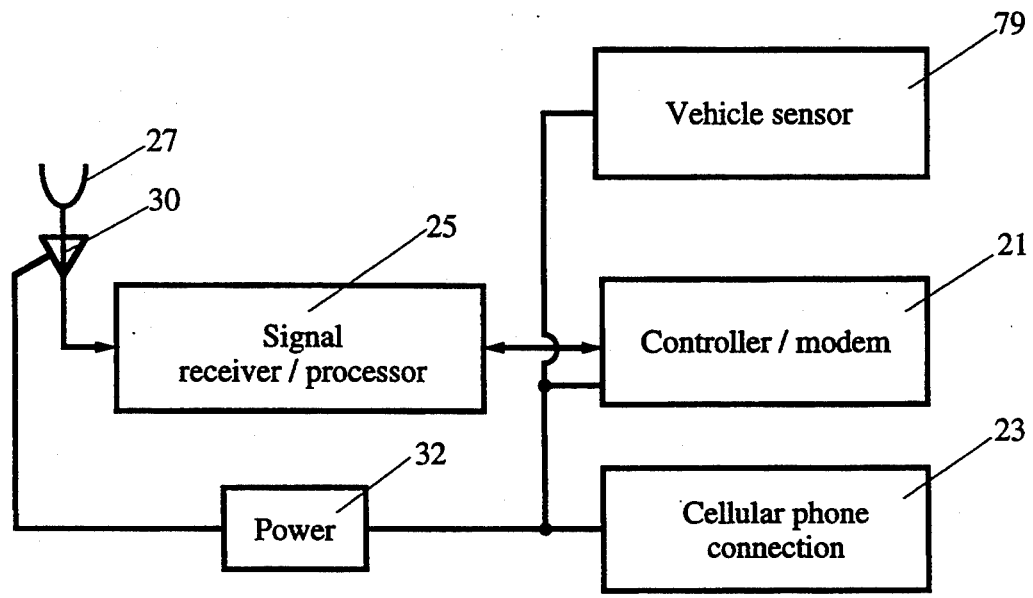

FIG. 5 illustrates electronic apparatus to be carried on or provided adjacent to the vehicle according to the second embodiment of the invention. The paging request responder 19 shown in FIG. 4 is replaced by a trigger event sensor 79 that functions as discussed in connection with FIG. 3, with all other components being as in FIG. 4.

The Global Positioning System (GPS) is part of a satellite-based navigation system developed by the United States Defense Department under its Navstar program. A fully operational GPS includes up to 24 satellites approximately uniformly dispersed around six circular orbits with four satellites each, the orbits being inclined at an angle of 55° relative to the equator and being separated from each other by multiples of 60° longitude. The orbits have radii of approximately 26,560 kilometers and are approximately circular. The orbits are non-geosynchronous, with 0.5 sidereal day (11.967 hours) orbital time intervals, so that the satellites move with time relative to the Earth below. Theoretically, three or more GPS satellites will be visible from most points on the Earth's surface, and visual access to one or more such satellites can be used to determine an observer's position anywhere on the Earth's surface, 24 hours per day. In the present GPS procedure, GPS signals from three or more satellites are used to determine position. However, by using other signal coding techniques, it may be possible to use GPS signals received from only two, or even one, GPS satellite for position determination. Each satellite carries a cesium or rubidium atomic clock to provide timing information for the signals transmitted by the satellites. Internal clock correction is provided for each satellite clock.

Each GPS satellite transmits two L-band carrier signals: an L1 signal having a frequency f1=1575.42 MHz and an L2 signal having a frequency f2=1227.6 MHz. These two frequencies are integral multiples f1=1500 f0 and f2=1200 f0 of a base frequency f0=1.023 MHz. The L1 and L2 signals from each satellite are binary phase shift key (BPSK) modulated by predetermined pseudo random noise (PRN) codes that are different for each of the GPS satellites deployed. One motivation for use of two carrier signals L1 and L2 is to allow partial compensation for propagation delay of such a signal through the ionosphere, which delay varies approximately as the inverse square of signal frequency f (delay $\alpha f^{-2}$). This phenomenon is discussed by MacDoran in U.S. Pat. No. 4,463,357, which discussion is incorporated by reference herein. When transit time delay through the ionosphere is determined, a phase delay associated with a given carder signal can be determined.

Use of the PRN codes allows use of a plurality of GPS satellite signals for determining an observer's position and for providing navigation information. A signal transmitted by a particular GPS signal is selected by generating and matching, or correlating, the PRN code for that particular satellite. All PRN codes are known and are stored in GPS satellite signal receivers carried by ground observers. A first PRN code for each GPS satellite, sometimes referred to as a precision code or P-code, is a relatively long, fine-grained code having an associated clock rate of 10 f0=10.23 MHz. A second PRN code for each GPS satellite, sometimes referred to as a clear/acquisition code or C/A code, is intended to facilitate rapid satellite signal acquisition and is a relatively short, coarser-grained code having a clock rate of f0=1.023 MHz. The C/A code for any GPS satellite has a length of 1023 chips or time increments before this code repeats. The P-code for any GPS satellite has a length of precisely one week (7.000 days) before this code repeats. The GPS satellite bit stream includes information on the ephemeris of each GPS satellite, parameters identifying the particular GPS satellite, and corrections for ionospheric signal propagation delays. A useful discussion of the GPS and techniques for obtaining position information from the satellite signals is found in Guide To GPS Positioning, edited by David Wells, Canadian GPS Associates, 1986.

A second configuration for global positioning is the GLONASS system, placed in orbit by the former Soviet Union. GLONASS also uses 24 satellites, distributed approximately uniformly in three orbital planes of eight satellites each. Each orbital plane has a nominal inclination of 64.8° relative to the equator, and the three orbital planes are separated from each other by multiples of 120° longitude. The GLONASS circular orbits have smaller radii, about 25,510 kilometers, and a satellite period of revolution of 8/17 of a sidereal day (11.26 hours). A GLONASS satellite and a GPS satellite will thus complete 17 and 16 revolutions, respectively, around the Earth every 8 days. The GLONASS system uses two carrier signals L1 and L2 with frequencies of f1=(1.602+9k/16) MHz and f2=(1.246+7k/16) MHz, where k (=0, 1, 2, ..., 23) is the channel or satellite number. Because the channel frequencies are distinguishable from each other, the P-code, and also the C/A code, is the same for each satellite. Reference to a Global Positioning System or GPS herein refers to a GPS satellite configuration and to a GLONASS satellite configuration.

Although implementation of the invention herein uses a GPS or GLONASS satellite system to provide "location fix" signals from which the location of the signal receiver processor can be determined, other methods may also be used to provide a location fix. For example, the LORAN system, which provides a plurality of three or more tall structures, each having a transmitter that broadcasts a time-coded message sequence, can be used to determine present vehicle location by triangulation. The LORAN system is described in U.S. Pat. No. 3,665,086, issued to Magee et al, which is incorporated herein by reference. If a time-coded message sequence is received from each of three LORAN transmitters, the relative time delays between these three messages can be used to determine the location of the signal receiver/processor with an estimated inaccuracy of several meters. One disadvantage of use of a LORAN system, vis-a-vis a GPS or GLONASS positioning system, is that a large number of tall structures, with transmitters mounted thereon, must be used to cover a given area with a LORAN system; whereas a relatively small number of GPS or GLONASS satellites suffice for location determination using a GPS or GLONASS configuration. Using a LORAN location determination system, a LORAN signal receiver/processor would replace the GPS (or GLONASS) signal receiver/processor in FIGS. 1 and 2, with all other features remaining as before.

A third method of providing a location fix for a missing vehicle is through "dead reckoning", using a plurality of gyroscopes whose angular orientations relative to an initial, fixed coordinate system are accumulated, read out and transmitted to the vehicle location service center, upon receipt of a command from a controller/modem carried by the vehicle. This approach to providing a location fix requires that the vehicle velocity v(t) and gyroscopically-determined angle cosines $\alpha(t)$, $\beta(t)$ and $\chi(t)$ for vehicle orientation be monitored during all times the vehicle is in motion, in order to provide the cumulative location coordinate changes $$\Delta x(t) = \int v(t') \cos \alpha(t') \, dt',$$

$$\Delta y(t) = \int v(t') \cos \beta(t') \, dt',$$

$$\Delta z(t) = \int v(t') \cos \chi(t') \, dt',$$

of the vehicle at any particular time t from a known initial location. Use of gyroscopes as a navigation instrument for determination of the present angle cosines of an object is described in U.S. Pat. No. 4,370,815, issued to Younkin. Use of a gyroscope for land vehicle navigation is disclosed by Romacker in U.S. Pat. No. 4,416,066. Use of a gyroscope and an induced magnetic field during rotation of a body to obtain an angle cosine and its time derivative is disclosed by Moore in U.S. Pat. No. 4,197,655. Use of a gyroscope and an acoustic surface wave sensor to obtain an angle cosine and its time derivative is disclosed in U.S. Pat. No. 4,384,409, issued to Lao. These patents, which are incorporated by reference herein, teach methods for use of one or more gyroscopes for determining an angle cosine and its time derivative and for simple navigation.

A fourth method of providing a location fix for a missing vehicle is through dead reckoning, using a plurality of local magnetic field direction sensors whose angular orientations relative to an initial, fixed coordinate system are accumulated, read out and transmitted to the vehicle location service center, upon receipt of a command from a controller/modem carded by the vehicle. This approach to providing a location fix requires that the vehicle velocity v(t) and the angle cosines $\alpha(t)$, $\beta(t)$ and $\chi(t)$ describing vehicle orientation, determined by the local magnetic field direction, also be monitored during all times the vehicle is in motion, in order to provide the cumulative location coordinate changes $$\Delta x(t) = \int v(t') \cos \alpha(t') \, dt',$$

$$\Delta y(t) = \int v(t') \cos \beta(t') \, dt',$$

$$\Delta z(t) = \int v(t') \cos \chi(t') \, dt',$$

of the vehicle at any particular time t from a known initial location. Use of local magnetic field direction sensors to help determine the present direction of a moving object is described by Takai in U.S. Pat. No. 4,743,913. The Earth's magnetic field varies in intensity from about −0.7 Gauss near the South Pole to approximately 0 Gauss at the equator to around +0.6 Gauss at 60° North latitude, which passes near the magnetic north pole in the Hudson Bay region of North America, according to D. S. Parasnis, *Magnetism*, Harper & Brothers, New York, 1961, pp. 91–121. The direction of the local magnetic field varies in an irregular manner with the latitude and longitude coordinates on the Earth's surface. Thus, if a map of the amplitude and direction of the local magnetic field is prepared and stored in a computer memory, which can be carried on the vehicle or kept at a base station of the missing vehicle location system, use of the map plus the output signals from the local magnetic field sensors will allow the present location of the vehicle, whether in motion or not, to be determined with acceptable accuracy.

I claim:

1. Apparatus for determining the present location of a missing vehicle, the apparatus comprising:
    a GPS signal antenna and receiver/processor, connected to the antenna, attached to a vehicle, to receive and process GPS signals to determine the present location of the vehicle to which the antenna and receiver/processor are attached;
    an event sensor that determines when a selected trigger event involving the vehicle has occurred and issuing a sensor output signal when that event occurs;
    controller means, connected to the GPS receiver/processor and to the event sensor, for receiving the event sensor output signal and, in response thereto, for issuing a first output signal that is received by the GPS receiver/processor that commands the receiver/processor to determine and issue as an output signal the present location of the receiver/processor, and for receiving the receiver/processor output signal representing present location of the receiver/processor and issuing this present location information as a second output signal;

a cellular telephone, connected to the controller means, for receiving the controller means second output signal and, in response thereto, for transmitting the controller means second output signal to a selected telephone number; and a power supply to deliver electrical power to at least one of the receiver/processor, the event sensor, the controller means and the cellular transmitter, where the receiver/processor, the event sensor, the controller means, and the cellular telephone are all carried on the vehicle whose present location is to be determined.

2. The apparatus of claim 1, wherein the presence of at least one of said antenna, said receiver/processor and said cellular telephone is concealed on said vehicle.

3. A method for determining the present location of a missing vehicle, the method comprising the steps of:

providing a vehicle with a vehicle location signal receiver/processor that receives position location signals from two or more location-sensing sensors located on the vehicle and uses these signals to determine the present location of the vehicle on which the antenna and the receiver/processor are located, where the receiver/processor comprises:

a plurality of gyroscopes and associated vehicle angular orientation sensors attached to the vehicle to determine and issue output signals indicating the present angular orientation of the vehicle;

a vehicle velocity sensor to determine and issue an output signal indicating the present velocity of the vehicle; and a signal processor that receives the output signals from the vehicle angular orientation sensors and the vehicle velocity sensor and determines the present location of the vehicle from these signals;

providing the vehicle with a page responder to respond to a page request broadcast by a vehicle location service or paging service;

providing the vehicle with a cellular telephone that may be activated to place a telephone call to a selected telephone number;

providing the vehicle with a controller/modem that is electrically connected to, and controls the operation of, the receiver/processor, the page responder and the cellular telephone;

when the vehicle is determined to be missing, causing the vehicle location service or paging service to broadcast a page requesting the present location of the missing vehicle;

causing the page responder in the vehicle to receive the page request and, in response thereto, to cause the controller/modem to interrogate the receiver/processor concerning the present location of the vehicle;

causing the receiver/processor to obtain information on the present location of the missing vehicle and to provide this information for the controller/modem; and causing the controller/modem to cause the cellular telephone to contact a selected vehicle location service or paging service and to communicate information on the vehicle present location to the vehicle location service or paging service, whereby information on the present location of the vehicle is made available to an owner or operator of the missing vehicle.

4. A method for determining the present location of a missing vehicle, the method comprising the steps of:

providing a vehicle with a vehicle location signal receiver/processor that receives position location signals from two or more location-sensing sensors located on the vehicle and uses these signals to determine the present location of the vehicle on which the antenna and the receiver/processor are located, where the receiver/processor comprises:

a plurality of local magnetic field angular orientation sensors attached to the vehicle to determine and issue output signals indicating the present angular orientation of the vehicle;

a vehicle velocity sensor to determine and issue an output signal indicating the present velocity of the vehicle; and a signal processor that receives the output signals from the vehicle angular orientation sensors and the vehicle velocity sensor and determines the present location of the vehicle from these signals;

providing the vehicle with a page responder to respond to a page request broadcast by a vehicle location service or paging service;

providing the vehicle with a cellular telephone that may be activated to place a telephone call to a selected telephone number;

providing the vehicle with a controller/modem that is electrically connected to, and controls the operation of, the receiver/processor, the page responder and the cellular telephone;

when the vehicle is determined to be missing, causing the vehicle location service or paging service to broadcast a page requesting the present location of the missing vehicle;

causing the page responder in the vehicle to receive the page request and, in response thereto, to cause the controller/modem to interrogate the receiver/processor concerning the present location of the vehicle;

causing the receiver/processor to obtain information on the present location of the missing vehicle and to provide this information for the controller/modem; and causing the controller/modem to cause the cellular telephone to contact a selected vehicle location service or paging service and to communicate information on the vehicle present location to the vehicle location service or paging service, whereby information on the present location of the vehicle is made available to an owner or operator of the missing vehicle.

5. A method for determining the present location of a missing vehicle, the method comprising the steps of:

providing a vehicle with a vehicle location signal receiver/processor that receives position location signals from two or more location-sensing sensors located on the vehicle and uses these signals to determine the present location of the vehicle on which the antenna and the receiver/processor are located, where the receiver-processor comprises:

a plurality of gyroscopes and associated vehicle angular orientation sensors attached to the vehicle to determine and issue output signals indicating the present angular orientation of the vehicle;

a vehicle velocity sensor to determine and issue an output signal indicating the present velocity of the vehicle; and a signal processor that receives the output signals from the vehicle angular orientation sensors and the vehicle velocity sensor and determines the present location of the vehicle from these signals;

providing the vehicle with an event sensor to sense occurrence of a selected vehicle trigger event involving the vehicle;

providing the vehicle with a cellular telephone that may be activated to place a telephone call to a selected telephone number;

providing the vehicle with a controller/modem that is electrically connected to, and controls the operation of, the receiver/processor, the event sensor and the cellular telephone;

when the sensor determines that a vehicle trigger event has occurred, causing the controller/modem to interrogate the receiver/processor concerning the present location of the vehicle;

causing the receiver/processor to obtain information on the present location of the vehicle and to provide this information for the controller/modem; and causing the controller/modem to cause the cellular telephone to contact a selected vehicle location service or paging service and to communicate information on the vehicle present location to the vehicle location service or paging service, whereby information on the present location of the vehicle is made available to an owner or operator of the vehicle.

6. A method for determining the present location of a missing vehicle, the method comprising the steps of:

providing a vehicle with a vehicle location signal receiver/processor that receives position location signals from two or more location-sensing sensors located on the vehicle and uses these signals to determine the present location of the vehicle on which the antenna and the receiver/processor are located, where the receiver-processor comprises:

a plurality of local magnetic field angular orientation sensors attached to the vehicle to determine and issue output signals indicating the present angular orientation of the vehicle;

a vehicle velocity sensor to determine and issue an output signal indicating the present velocity of the vehicle; and a signal processor that receives the output signals from the vehicle angular orientation sensors and the vehicle velocity sensor and determines the present location of the vehicle from these signals;

providing the vehicle with an event sensor to sense occurrence of a selected vehicle trigger event involving the vehicle;

providing the vehicle with a cellular telephone that may be activated to place a telephone call to a selected telephone number;

providing the vehicle with a controller/modem that is electrically connected to, and controls the operation of, the receiver/processor, the event sensor and the cellular telephone;

when the sensor determines that a vehicle trigger event has occurred, causing the controller/modem to interrogate the receiver/processor concerning the present location of the vehicle;

causing the receiver/processor to obtain information on the present location of the vehicle and to provide this information for the controller/modem; and causing the controller/modem to cause the cellular telephone to contact a selected vehicle location service or paging service and to communicate information on the vehicle present location to the vehicle location service or paging service, whereby information on the present location of the vehicle is made available to an owner or operator of the vehicle.

7. A method for determining the present location of a missing vehicle, the method comprising the steps of:

providing a vehicle with a LORAN signal antenna and receiver/processor, connected to the antenna, where the antenna and receiver/processor receive time-coded LORAN signals from a plurality of LORAN signal transmitters and determine the location of a selected vehicle vehicle location from these signals;

providing the vehicle with a page responder to respond to a page request broadcast by a vehicle location service or paging service;

providing the vehicle with a cellular telephone that may be activated to place a telephone call to a selected telephone number;

providing the vehicle with a controller/modem that is electrically connected to, and controls the operation of, the receiver/processor, the page responder and the cellular telephone;

when the vehicle is determined to be missing, causing the vehicle location service or paging service to broadcast a page requesting the present location of the missing vehicle;

causing the page responder in the vehicle to receive the page request and, in response thereto, to cause the controller/modem to interrogate the receiver/processor concerning the present location of the vehicle;

causing the LORAN signal receiver/processor to obtain information on the present location of the vehicle and to provide this information for the controller/modem; and causing the controller/modem to cause the cellular telephone to contact a selected vehicle location service or paging service and to communicate information on the vehicle present location to the vehicle location service or paging service, whereby information on the present location of the vehicle is made available to an owner or operator of the missing vehicle.

8. The method of claim 7, further comprising the step of concealing the presence of at least one of said antenna, said receiver/processor and said cellular telephone on said vehicle.

9. The method of claim 7, further comprising the step of decoding said vehicle present location information received by said vehicle location service or paging service.

10. The method of claim 7, further comprising the step of causing said cellular telephone to communicate said present location information for said vehicle at least twice in response to receipt of said page request by said controller/modem.

11. The method of claim 7, further comprising the step of causing said cellular telephone to communicate said present location information for said vehicle once in response to receipt of said page request by said controller/modem.

12. The method of claim 7, further comprising the step of displaying said present location of said vehicle on a map or visual display after said present location information is received by said vehicle location service or paging service.

13. The method of claim 7, further comprising the step of causing said receiver/processor to occupy an inactive mode and to reduce its electrical power consumption, except when responding to receipt of said interrogation from said controller/modem.

14. The method of claim 13, further comprising the step of periodically activating said receiver/processor for a selected time interval and causing said receiver/processor to redetermine its present location.

15. The method of claim 7, further comprising the step of concealing the presence of at least one of said receiver/processor, said antenna and said cellular telephone on said vehicle.

16. The method of claim 7, further comprising the step of choosing said vehicle location signal antenna and receiver/processor to be a GPS signal antenna and receiver/processor that receive time-coded GPS signals from one or more satellites and determine said vehicle location from these signals.

17. A method for determining the present location of a vehicle that has been moved or tampered with in an unauthorized manner, the method comprising the steps of:
providing a vehicle with a vehicle location signal antenna and receiver/processor, connected to the antenna, where the vehicle location signal antenna and receiver/processor are drawn from the class consisting of (i) a GPS signal antenna and receiver/processor that receive time-coded GPS signals from one or more satellites and determine the present location of a selected vehicle from these signals and (ii) a LORAN signal antenna and receiver/processor that receive time-coded LORAN signals from a plurality of LORAN signal transmitters and determine the present location of a selected vehicle from these signals;
providing the vehicle with an event sensor to sense occurrence of a selected vehicle trigger event involving the vehicle;
providing the vehicle with a cellular telephone that may be activated to place a telephone call to a selected telephone number;
providing the vehicle with a controller/modem that is electrically connected to, and controls the operation of, the receiver/processor, the event sensor and the cellular telephone;
when the sensor determines that a vehicle trigger event has occurred, causing the controller/modem to interrogate the receiver/processor concerning the present location of the vehicle;
causing the receiver/processor to obtain information on the present location of the vehicle and to provide this information for the controller/modem; and
causing the controller/modem to cause the cellular telephone to contact a selected vehicle location service or paging service and to communicate information on the vehicle present location to the vehicle location service or paging service,
whereby information on the present location of the vehicle is made available to an owner or operator of the vehicle.

18. The method of claim 17, further comprising the step of concealing the presence of at least one of said antenna, said receiver/processor and said cellular telephone on said vehicle.

19. The method of claim 17, further comprising the step of choosing, as said vehicle trigger event, the unauthorized movement of said vehicle, as sensed by said event sensor.

20. The method of claim 17, further comprising the steps of:
choosing as said event sensor a vehicle security alarm that senses occurrence of an unauthorized action affecting said vehicle; and
choosing, as said trigger event, activation of this security alarm.

21. The method of claim 17, further comprising the step of decoding said vehicle present location information received by said vehicle location service or paging service.

22. The method of claim 17, further comprising the step of causing said cellular telephone to communicate said present location information for said vehicle at least twice in response to occurrence of said vehicle trigger event.

23. The method of claim 17, further comprising the step of causing said cellular telephone to communicate said present location information for said vehicle once in response to occurrence of said vehicle trigger event.

24. The method of claim 17, further comprising the step of displaying said present location of said vehicle on a map or other visual display after said present location information is received by said vehicle location service or paging service.

25. The method of claim 17, further comprising the step of causing said receiver/processor to occupy an inactive mode and to reduce its electrical power consumption, except when responding to receipt of said interrogation from said controller/modem.

26. The method of claim 25, further comprising the step of periodically activating said receiver/processor for a selected time interval and causing said receiver/processor to redetermine its present location.

27. The method of claim 17, further comprising the step of concealing the presence of at least one of said antenna, said receiver/processor and said cellular telephone on said vehicle.

* * * * *